UNITED STATES PATENT OFFICE.

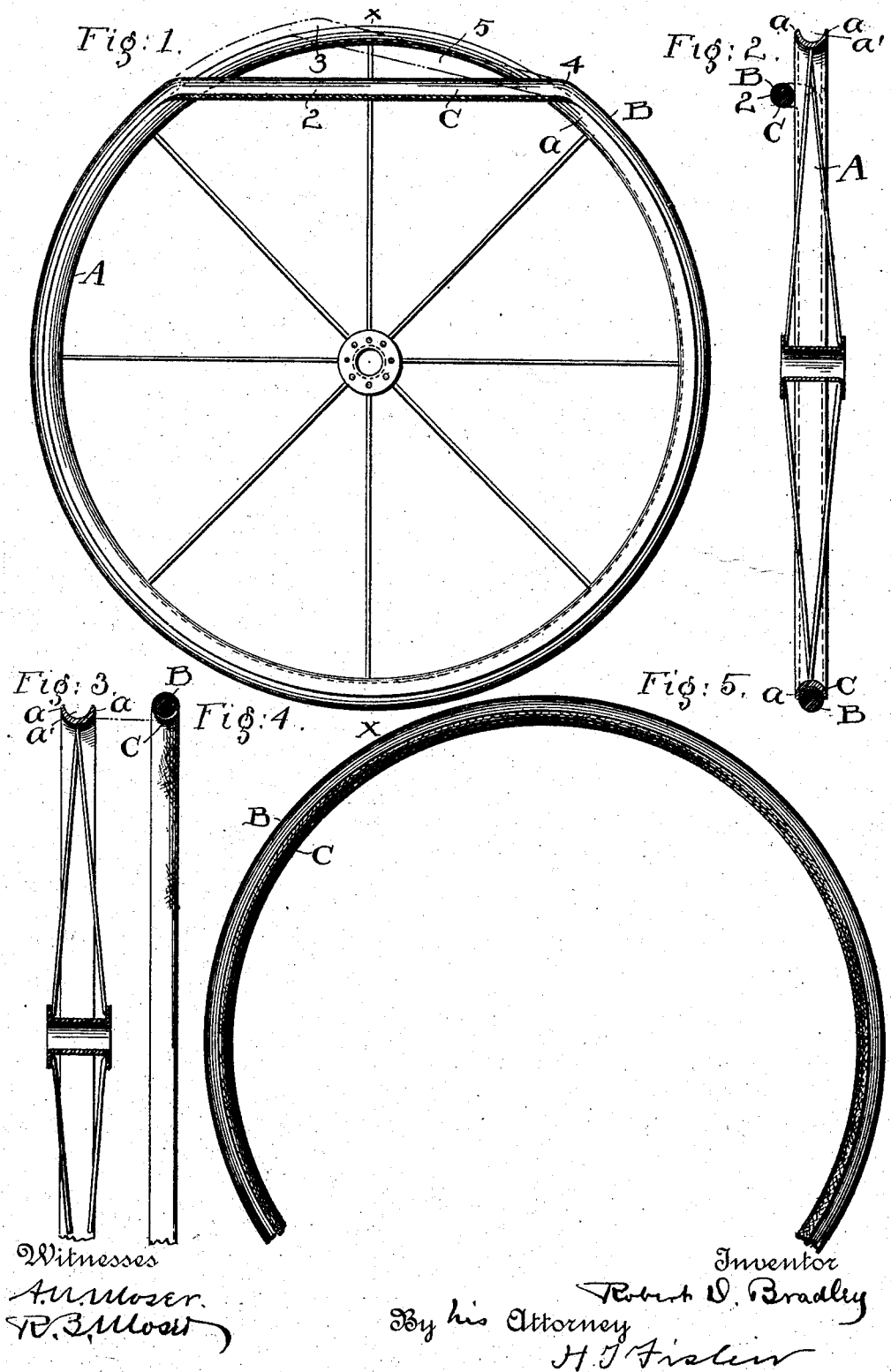

ROBERT D. BRADLEY, OF CANTON, OHIO.

ENDLESS SOLID-RUBBER TIRE.

No. 806,101. Specification of Letters Patent. Patented Dec. 5, 1905.

Application filed April 10, 1905. Serial No. 254,662.

*To all whom it may concern:*

Be it known that I, ROBERT D. BRADLEY, a citizen of the United States, residing at Canton, in the county of Stark and State of Ohio, have invented certain new and useful Improvements in Endless Solid-Rubber Tires; and I do declare that the following is a full, clear, and exact description of the invention, which will enable others skilled in the art to which it appertains to make and use the same.

My invention relates to endless solid-rubber tires for children's vehicles; and the invention consists in a tire which is of solid rubber, preferably round in cross-section, and provided with an inelastic woven lining about its inner circumference where it rests upon the rim, all substantially as shown and described, and particularly pointed out in the claim.

In the accompanying drawings, Figure 1 is a side elevation of a wheel with a grooved or channeled rim, with the tire in position to turn it upon or about the rim; and Fig. 2 is a central cross-section of Fig. 1 on line $x$ $x$ on said figure. Fig. 3 is a central cross-section of the wheel alone, and Fig. 4 is a cross-section of the tire alone, and Fig. 5 is a side elevation of the tire ready for use.

The invention as thus shown appertains more particularly to the grade or kind of vehicle-wheels used for baby-carriages, children's express-wagons, and the like, where the tire is used in conjunction with a wheel-rim substantially semicircular in cross-section and which is relatively light in itself, being usually formed up or fashioned from a suitable grade of thin sheet metal and in which reliance is placed mostly on the depth of its side flanges for confining the tire. However, mere depth of groove or flange alone has been found not to serve the purpose, because the tire necessarily is elastic, as it is necessarily comparatively soft and flexible, and hence if there be no other means to confine it upon the wheel it will roll out of its place under torsional strain, as in cases of short turns with a heavy side pressure, in which a side rolling effect is exerted and inevitable displacement of the tire follows. This is common experience with the unprotected tires in wheels of this kind. I have therefore anticipated this defect in the all-rubber elastic tire and a simple grooved or flanged rim to carry the same by providing a tire which is equipped with a retaining medium of its own, and where the old tire itself is converted into a practically inelastic or non-stretchable tire, but which, notwithstanding this characteristic, can be placed upon the rim with its relatively high side flanges, as heretofore made and used.

To these ends the invention comprises a wheel with a rim A, substantially semicircular or less in cross-section or with a circumferential channel or groove about its periphery of a rounded form and having a flange $a$ at each side and a solid-rubber elastic tire B, adapted to be permanently secured in said groove. Upon the tire thus made I seal or cement a suitable strong woven-fabric lining C, such as a suitable grade of canvas, about its inner circumference or surface and of a width substantially equal to the width of the groove $a'$ from edge to edge thereof. The said lining is permanently adhered to said tire, and the tire as thus made and comprising the rubber portion B and inner restricting-lining C constitutes a complete and original article of manufacture and sale. The said inelastic lining meets snugly at its ends, so as to leave no space between said ends to be bridged or spanned with an extra piece of fabric at any time, whether before or after the tire has been placed on the wheel. Now having a grooved or flanged wheel-rim and an elastic tire provided with an inelastic lining, as described, and desiring to place the tire on the wheel, I first encircle the rim with the tire as far and as fully as can be done by hand, as in full lines, Fig. 1. This leaves a portion 2 equal to about one-fifth of the entire length of the tire lying outside the rim. The next step is to lessen this outside length by somewhat forcible means until the length thereof is relatively about as seen between points 3 and 4, and which also carries such outside portion up much nearer to the rim. The first taking up of the portion 2 is obtained largely by drawing all possible slack out of the tire where it incloses the rim, which is helped by working the stock forward about each side to the tension-points 3 and 4. Then power is applied by suitable means to turn or roll the remaining outside portion 5 between points 3 and 4 into the channel of the rim, which must involve at least a measure of surrender in the lining C at this point and more or less back therefrom in the other portion of the tire, and there is a certain stretching of the goods obtained which does not constitute elasticity as such and which nothing but severe strain can effect. Thus the tire is at last placed upon or over the rim, and being there it may be further secured by cementing the same to the rim. Now, looking for the secret of the effectiveness of a tire built in this way, it will be seen that the lining has become and is a definite restricting-band on the inner circumference of the tire so far beneath the edges of flanges $a$ that it is practically impossible to remove it therefrom when once in place without disrupting the lining.

When the tire is once on the wheel, it resets itself thereon, distributing any stretching it may have received at one point more than another around its entire portion and resuming its normal condition uniformly at all points.

Obviously if a tire of this kind can be used on other and larger vehicles it may be without departing from the spirit of the invention.

If preferred, the ends of the lining might overlap, which would be equivalent, in effect, to matching them as used herein. In both cases the entire inner surface of the tire is lined.

It will be observed that the flanged channel or groove in the rim of the wheel is permanently formed, as shown, and that there is no way to place the tire on the rim but by carrying it over the flanges thereof substantially in the manner described. When on, this is the practical effect and value of the invention, that a solid elastic and comfortable cushioning-tire is obtained which is practically tied about the base of the channel in rim A by reason of the inner lining portion of the tire fitting closely upon said rim.

What I claim is—

As a new article of manufacture, a tire for children's vehicles consisting of a solid endless annular body of rubber adapted to be rolled onto a rim and having a lining of closely-woven fabric cemented to the inner circumference thereof and covering the entire inner surface of the tire.

In testimony whereof I sign this specification in the presence of two witnesses.

ROBERT D. BRADLEY.

Witnesses:
F. J. WILSON,
EDWIN DAVIS.